United States Patent
Aldridge et al.

(10) Patent No.: US 7,415,494 B2
(45) Date of Patent: Aug. 19, 2008

(54) DIVIDER APPARATUS AND ASSOCIATED METHOD

(75) Inventors: Christopher Anthony Aldridge, Singapore (SG); Wee Tiong Tan, Singapore (SG); Chia Kwang Kang, Singapore (SG)

(73) Assignees: STMicroelectronics Asia Pacific PTE Ltd, Singapore (SG); National University of Singapore, Singapore (SG)

( * ) Notice: Subject to any disclaimer, the term of this patent is extended or adjusted under 35 U.S.C. 154(b) by 727 days.

(21) Appl. No.: 10/407,148

(22) Filed: Apr. 3, 2003

(65) Prior Publication Data

US 2003/0220958 A1   Nov. 27, 2003

(30) Foreign Application Priority Data

Apr. 30, 2002 (SG) .............................. 200201999-0

(51) Int. Cl.
*G06F 7/52* (2006.01)

(52) U.S. Cl. ...................................................... 708/655

(58) Field of Classification Search ................. 708/653, 708/655, 553, 555, 556
See application file for complete search history.

(56) References Cited

U.S. PATENT DOCUMENTS

| | | | | |
|---|---|---|---|---|
| 4,881,193 A | * | 11/1989 | Hamada et al. | 708/650 |
| 5,596,519 A | * | 1/1997 | Van Aken et al. | 708/655 |
| 5,805,489 A | * | 9/1998 | Fernando | 708/655 |
| 6,061,781 A | * | 5/2000 | Jain et al. | 712/221 |

\* cited by examiner

*Primary Examiner*—Chuong D Ngo
(74) *Attorney, Agent, or Firm*—Lisa K. Jorgenson; Jason T. Evans; Seed IP Law Group PLLC

(57) ABSTRACT

A method of dividing, in a micro computer unit (MCU), a first binary number (N), having a first number of significant bits, by a second binary number (D), having a second number of significant bits, produces an integer result (Y). The method includes: determining the difference (K) between the first and second numbers of significant bits; aligning the most significant bits (MSBs) of N and D by shifting the bits of D, by K bit positions, such that its MSB occupies the same relative bit position as the MSB of N; repeating K times: multiplying Y by 2; dividing D by 2; and, if N is greater than or equal to D: increasing Y by 1; setting N equal to N−D.

2 Claims, 4 Drawing Sheets

DIVIDER APPARATUS AND ASSOCIATED METHOD

BACKGROUND OF THE INVENTION

1. Field of the Invention

The present invention relates to a method and apparatus for performing division of two binary numbers in a digital system. The division may be performed using a microprocessor (µP), a microcomputer (µC), a Digital Signal Processor (DSP) or other similar digital processing device. The term Micro Computer Unit (MCU) will be used throughout this description to refer to any or all such processing devices.

2. Description of the Related Art

MCUs are typically used in a variety of devices requiring some form of digital processing capacity. Such devices cover a diverse range of uses ranging from washing machines to industrial control equipment, and televisions to central heating thermostats. A particular application for MCUs is in the field of telecommunications. MCUs are to be found in portable telephones and the associated base stations which allow the telephones to communicate with other users via a communication network.

MCUs used in telecommunication equipment are frequently employed to implement certain algorithms which are used e.g. to enhance the transmission of data, to encrypt data or to process control signals used to set up and control a communication channel. These algorithms are often carefully chosen so that they can be implemented in a straightforward fashion using existing MCUs.

In particular, prior art MCUs are generally not able to perform division operations particularly efficiently. Simple addition, subtraction and multiplication operations may be able to be performed in single instruction cycles, whereas division operations may occupy the MCU for many cycles. As such, algorithms are chosen or devised so that division is limited as far as possible to division by a factor of $2^n$ only, which equates to a simple bit-shift operation.

MCUs which are capable of performing division operations in a relatively short number of clock cycles, or even a single clock cycle, require the provision of very many custom logic gates to perform this function. As such, the overall complexity of the MCU is increased along with its size and power consumption. This is particularly undesirable in handheld communication equipment where physical size and battery life are two important design factors.

Given integer numbers Numerator (N) and Denominator (D), the prior art teaches a number of different ways to perform the divide operation N/D. A first simple method is to repeatedly subtract D from N, noting the number of times this process is repeated in a counter Y. The number of times this is possible before N becomes less than D gives the integer value of the result in Y. The remainder is held in N. Of course, such a simplistic system can require many clock cycles if N is many times larger than D, and as such is unsuitable for all but the simplest and least speed-critical of systems.

A particular problem arises when trying to configure an MCU for use with the UTRA (Universal Terrestrial Radio Access) FDD (Frequency Division Duplex) W-CDMA (Wideband—Code Division Multiple Access) communication standard. This particular standard specifies a particular division operation for use in calculating the parameters for rate matching/puncturing in the channel coder rate matching algorithm.

In designing a custom MCU for use with the UTRA FDD W-CDMA standard, it is not expected that the division operation will be called by the algorithm so frequently that it will require a specific block of custom hardware to perform a division in one clock cycle, but on the other hand, a balance must be struck between complex custom hardware and an over-lengthy division process occupying too much MCU time.

BRIEF SUMMARY OF THE INVENTION

A first embodiment of the present invention provides a method of dividing, in a micro computer unit (MCU), a first binary number (N), having a first number of significant bits, by a second binary number (D), having a second number of significant bits, to produce an integer result (Y), including the steps of:

(i) determining the difference (K) between the first and second numbers of significant bits;

(ii) aligning the most significant bits (MSBs) of N and D by shifting the bits of D, by K bit positions, such that its MSB occupies the same relative bit position as the MSB of N;

(iii) multiplying Y by 2;

(iv) if N is greater than or equal to D, then:
  increasing Y by 1;
  setting N equal to N−D;

(v) dividing D by 2;

(vi) repeating step (iii) to step (v) K times.

Preferably, the step of determining the difference between the first and second numbers of significant bits includes the steps of:

determining the first number of significant bits using a first circuit arrangement;

determining the second number of significant bits using the first circuit arrangement; and subtracting said second number from said first number.

Preferably, the step of determining the first number of significant bits using a first circuit arrangement includes the steps of: disabling one in a sequence of decrementers upon detection of a first occurrence of a '1' in the first binary number such that the final decrementer in the sequence outputs a number equivalent to the position of the MSB of the first binary number.

Typically, the step of aligning the most significant bits (MSBs) of N and D includes the step of multiplying D by $2^k$.

Advantageously, the method further includes the step of checking whether the second number is equal to zero.

Advantageously, further includes the step of checking whether the second number is greater than the first number.

A second embodiment of the present invention provides apparatus for dividing a first binary number (N) by a second binary number (D), to output an integer result (Y), including:

a first circuit arranged to calculate the number of significant bits in N and D;

a second circuit arranged to align the Most Significant Bits (MSBs) of N and D according to the difference (K) between the number of significant bits of N and D;

a third circuit arranged to repeat K times:
  multiplying Y by 2;
  dividing D by 2;
  increasing Y by 1, and setting N equal to N−D, if N is greater than or equal to D.

Preferably, the first circuit includes a plurality of sequentially connected decrementers arranged to be disabled by a first occurrence of a binary '1' in an input word, such that the output of the last in the plurality of sequentially connected decrementers outputs a number representing the bit position in the input word of its MSB.

Preferably, the second circuit includes a plurality of AND gates, each one of said plurality of AND gates having a plurality of input ports, and each one of said plurality of AND gates having a different combination of its input ports inverted.

BRIEF DESCRIPTION OF THE DRAWINGS

For a better understanding of the present invention and to understand how the same may be brought into effect, the invention will now be described by way of example only, with reference to the appended drawings in which.

DETAILED DESCRIPTION OF THE INVENTION

The following embodiment of the invention is described with particular reference to binary numbers having a maximum 16-bit word-length. The skilled person will, of course, realize that such word length is exemplary only, and the invention may be configured for use with binary words of any given word length.

The MCU in the embodiment described herein is capable of processing binary numbers having a word length of 16 bits. In other words, the binary numbers capable of being processed may include any combination of sixteen '1's and/or '0's. An important distinction is drawn between word-length, which in this case is 16 bits and is governed by the physical construction of the circuit, and the actual number of significant bits used to represent any given binary number, which can vary from zero bits up to the maximum.

For instance, the binary number representing decimal 1953 is 11110100001 or, written in full 16 bit format, 0000011110100001. The number of bits required to represent this binary number is 11 bits, as the most significant bit (MSB) occupies the $10^{th}$ bit position. The initial '0's are merely padding. Throughout this specification a distinction is to be drawn between word length which is a function of the physical construction of any given circuit, and actual number of significant bits required to represent a particular binary number.

The division process according to embodiments of the invention includes two main processes, each of which includes one or more sub processes.

In order to divide a given number (Numerator, N) by another given number (Denominator, D), a process as described hereafter is used. In order to carry out this process, it is first necessary to left align the Most Significant Bits (MSBs) of N and D. This process, known as normalization, shifts the bit positions of D to the left, which is smaller than N, so that its MSB occupies the same relative bit position as the MSB of N.

As an example of this, consider:
N=1953 (decimal), D=37 (decimal).
In binary:

The above binary representation of N and D shows that N has 11 significant bits, i.e. bits 0-10 are occupied, and that D has 6 significant bits, i.e. bits 0-5 are occupied.

In this case, before N can be divided by D, the relative position of the bits of D need to be shifted so that its MSB occupies the same relative bit position as the MSB of N.

By examining the above representation of N and D, it can be seen that the bits of D all need shifting left by 5 positions. In binary terms this equates to a multiplication of $2^5$ or 32.

Figure 1:
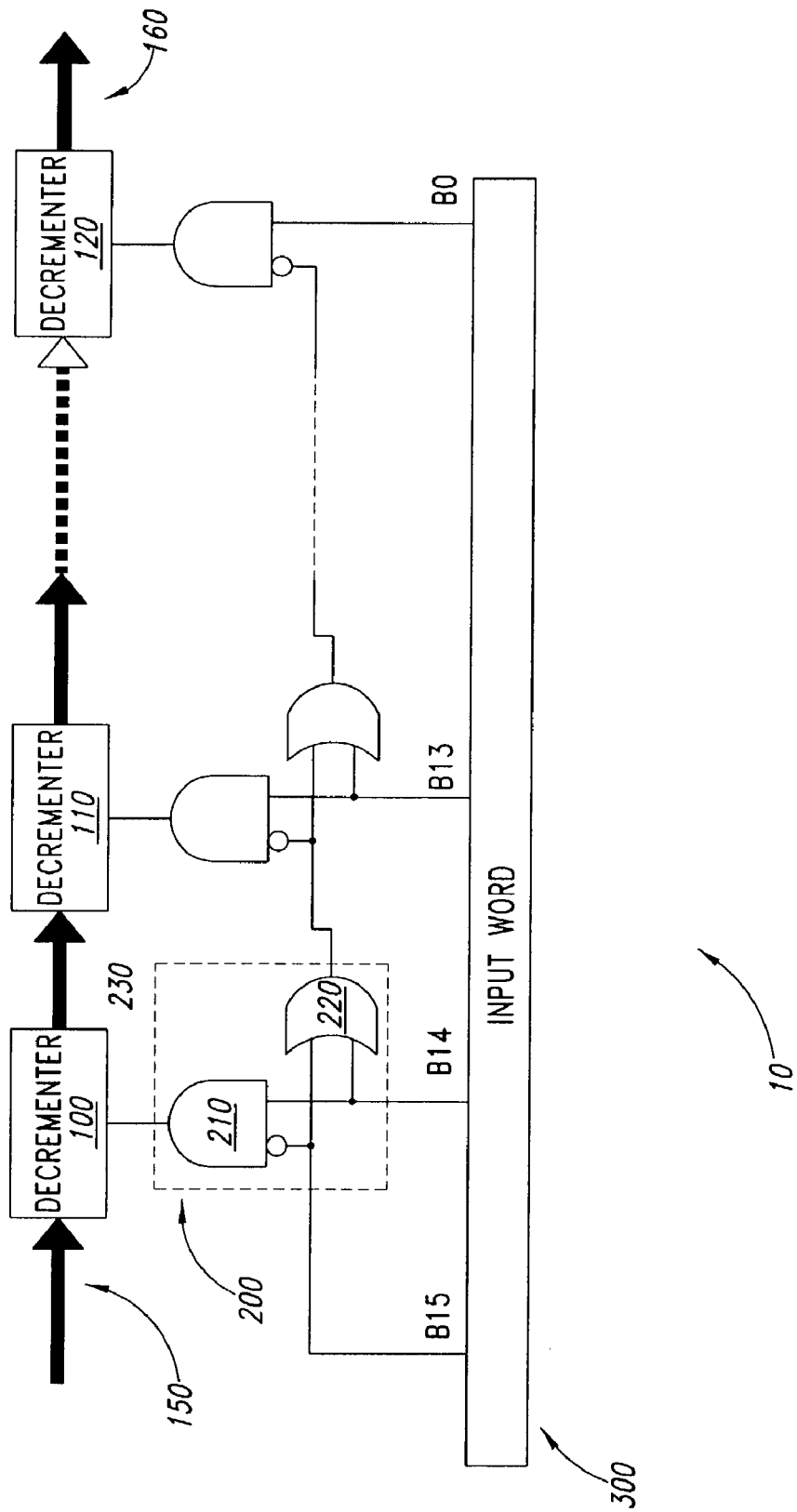
FIG. 1 shows a circuit arrangement for performing the 'Log( )' function on a 16-bit binary word.

This procedure can be carried out according to an embodiment of the present invention by use of the circuit arrangement 10 of FIG. 1. FIG. 1 shows the circuit elements which are necessary to accept, as an input, a multi-bit digital word and produce, as an output, a signal indicative of the position of the MSB of that input word.

The input is in the form of a 16-bit digital word 300. The input word is the word for which it is desired to determine the bit position of the MSB. The circuit 10 of FIG. 1 has another input signal 150, which is hard-wired and invariable. Input 150 is applied via a 4-bit bus to decrementer 100, and is set to a decimal value of 15, which is equivalent to all 4 bits of the data bus being set to '1'.

The circuit 10 of FIG. 1 includes a sequential chain of fifteen decrementers 100-120. Each decrementer is associated with one bit of the input word. Bit 15 (B15) is not associated with a decrementer. The decrementers are configured such that, when enabled, each one of them outputs a value equal to its input minus one. The enabling or disabling of each decrementer is controlled by logic blocks 200, each including an AND gate 210 and an OR gate 220. The logic blocks 200 each receive one bit of the input word 300.

If bit 15 (B15) of the input word—the MSB—is '1', then this acts as an input to logic block 200 which controls the enabling of the first decrementer 100. In this case, a value of '1' for B15 will disable the decrementer 100, meaning that it will output the same value as its input, i.e. 15.

The value of B15, '1', also propagates through all the logic blocks disabling each decrementer by virtue of the OR gate 220 in each logic block 200. In this way, each decrementer following an occurrence of a '1' in an input bit position is disabled.

In the case, therefore, when B15 is '1', the output from circuit 10, presented at the output of decrementer 120, is 15, which indicates that the position of the MSB is at bit 15.

If, however, bit 15 (B15) of the input word 300 is '0', and bit 14 (B14) is '1', then the decrementer 100 is enabled by a signal 230 from logic block 200 and it outputs a decimal value of 14 to decrementer 110.

In the same manner as described previously, when the value B14 is '1' this propagates via virtue of the OR gates 220 and this disables all subsequent decrementers so that the output from circuit 10 is set to 14, indicating that the MSB occupies bit 14.

If, however, bit 15 (B15) and bit 14 (B14) of the input word 300 are '0', then the decrementer 100 is enabled and it outputs 14 to decrementer 110. The enabling of decrementer 110 is then dependent upon the value of bit 13 (B13). If B13 is equal to '1', then decrementer 110 is enabled, and outputs a value of 13, indicating the MSB of the input word resides at bit position 13. All subsequent decrementers are disabled as previously described.

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| N= | 0 | 0 | 0 | 0 | 0 | 1 | 1 | 1 | 1 | 0 | 1 | 0 | 0 | 0 | 0 | 1 |
| D= | 0 | 0 | 0 | 0 | 0 | 0 | 0 | 0 | 0 | 0 | 1 | 0 | 0 | 1 | 0 | 1 |

The operation of the circuit is identical for all bit positions following B13, which are not illustrated in FIG. 1.

In effect, the circuit 10 returns the integer value of log(X)/log(2), where X is the input word. This calculation is equivalent to fix($log_2$(X)), where fix( ) is a fixed point operator.

The circuit 10 of FIG. 1 is able to return an output value within 1 MCU clock cycle.

Once the circuit 10 of FIG. 1 has operated on the Numerator N and the Denominator D and returned a value for each, corresponding to the position of its MSB, it is necessary to scale, or normalize, D such that its MSB aligns with the MSB of N.

Figure 2:
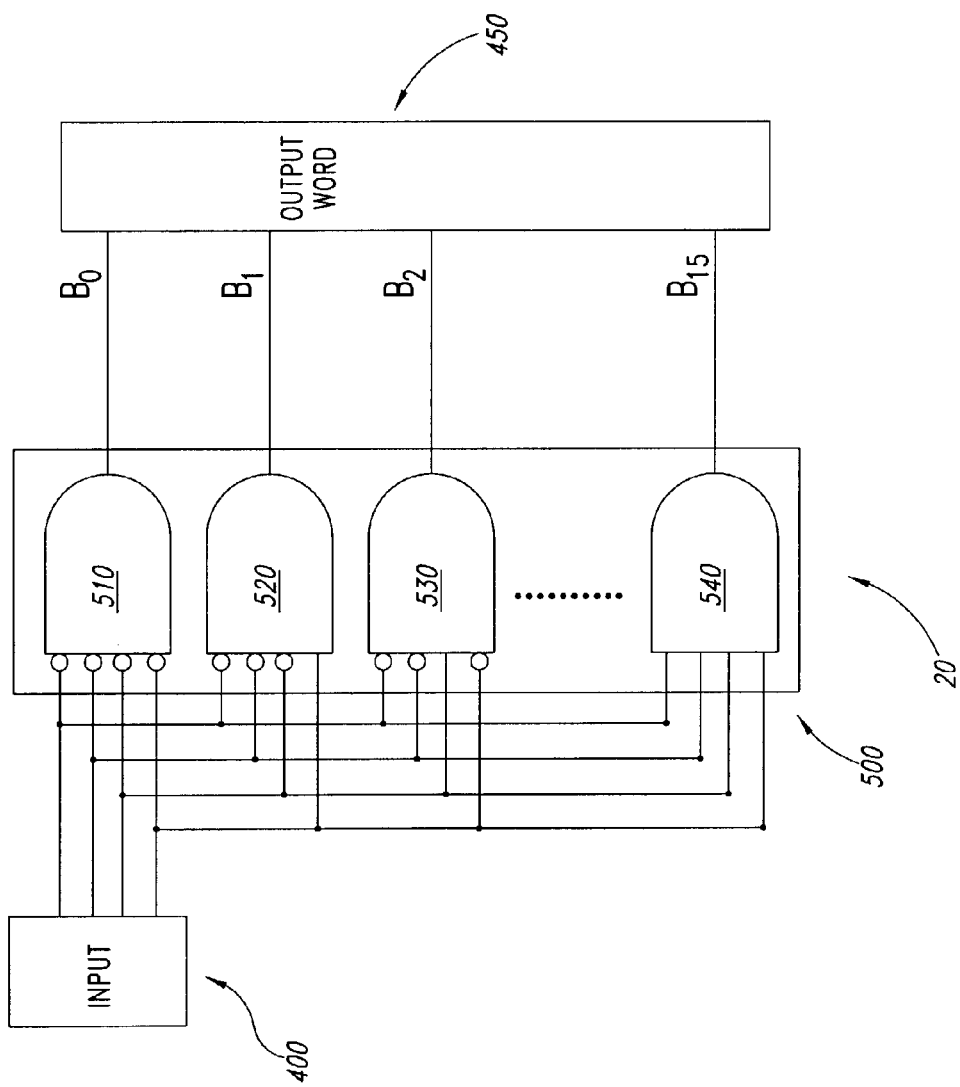
FIG. 2 shows a circuit arrangement for performing the 'Exp( )' function on a 16-bit binary word.

The scaling factor is calculated using the circuit 20 of FIG. 2. This circuit has as an input 400, a 4-bit word. The 4-bit word represents a decimal number up to 15 and corresponds to the difference in number of significant bits between N and D calculated using data calculated by the previous circuit 10 of FIG. 1. Using the example discussed above in which N has 11 significant bits and D has 6 significant bits, the input 400 would be 0101 (decimal 5).

The four bits of the input word 400 are each applied to an input of one of sixteen AND gates 500. Each AND gate of the sixteen has a different combination of its inputs inverted. In this example, with 4-input AND gates, there are $2^4$, or 16, different combinations possible, and hence the overall output word 450 will vary depending on the 4-bit input word 400.

The resultant output 450 is a 16-bit word that represents $2^k$, where K is the 4-bit input word 400 representing the difference in word length between N and D. As an example, if the input 400 is set to 0000, then only AND gate 510, having all its inputs inverted, will output a '1' and all the other AND gates will output a '0'. The overall output 450 is thus 0000000000000001, which is equivalent to 1 in decimal notation. The circuit 20 therefore calculates $2^{0=1}$, as expected. If the input word 400 is set to 1111 (15 in decimal notation), then only AND gate 540 will output a '1' and all other AND gates will output a '0'. The overall output is thus 1000000000000000, which is equivalent to 32768 in decimal notation. The circuit 20 therefore calculates $2^{15}$=32768 as expected.

Since the mathematical operation of multiplying a binary number by $2^k$ has the result of shifting all its bits K positions to the left, the circuit 20 can be used in conjunction with a regular multiplier to shift all the bits of the denominator D the requisite number of positions to normalize them with the numerator N.

Like the circuit 10 of FIG. 1, the circuit 20 of FIG. 2 produces a result within one MCU clock-cycle.

Once the Numerator N and Denominator D have been normalized as described, by use of circuits 10 and 20, the next part of the division process is to repeatedly perform a subtract, compare and shift operation.

Figure 3:
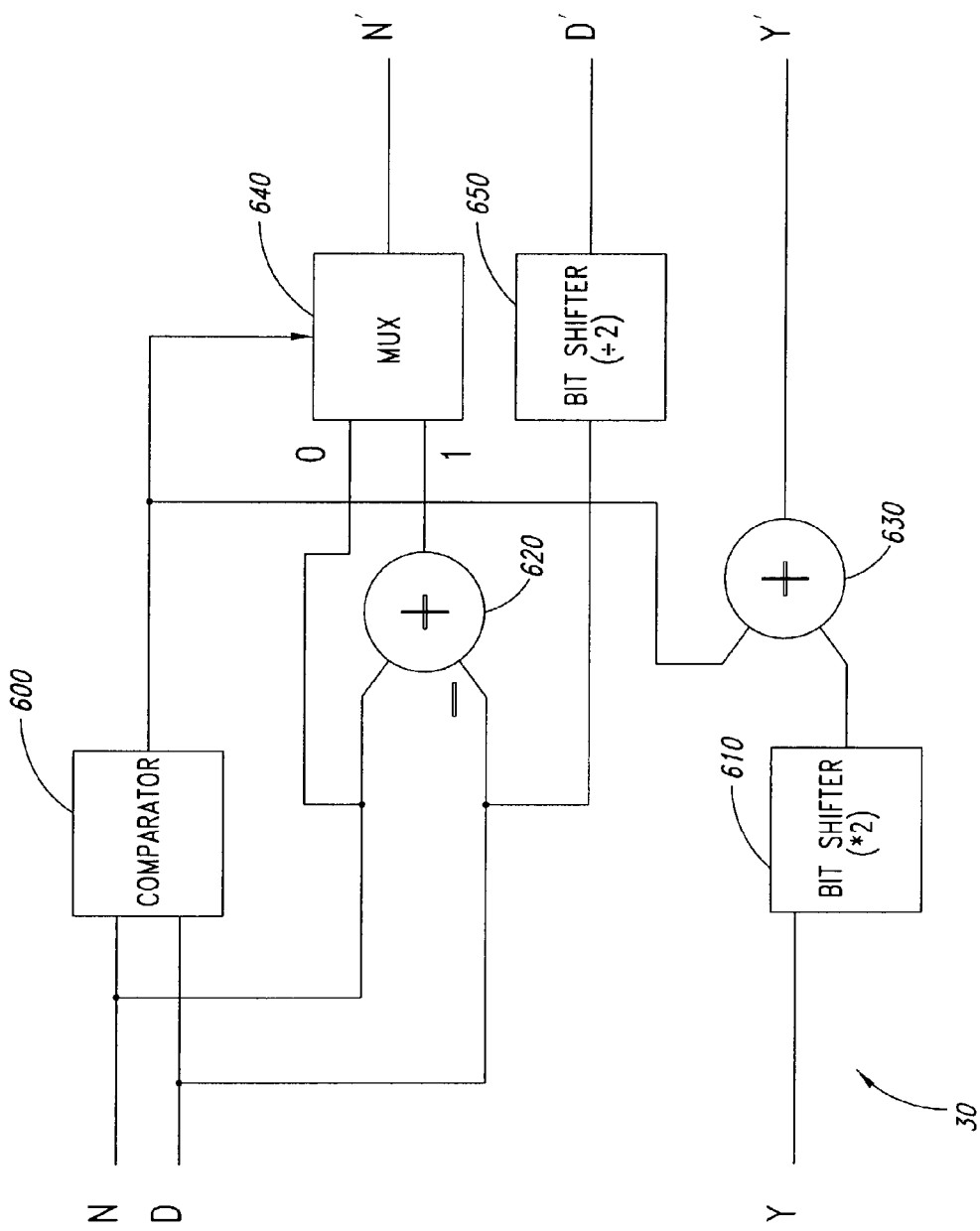
FIG. 3 shows a circuit arrangement for performing the 'half-divide( )' function.

Circuit 30 of FIG. 3 shows an arrangement for carrying out the so-called half divide operation including the steps of subtraction, comparison and shifting. Circuit 30 has three inputs: N, D and Y; and three outputs: N', D' and Y'.

Before commencing the iterative half-divide operation, Y must be initialized with a value of zero.

Y is then multiplied by 2. This is performed in block 610 which is a bit-shifter which shifts the word Y left by one bit, which is equivalent to a multiplication by 2. For the first iteration, this step is a dummy step, but in the following iterations, this is required to ensure that Y outputs the correct value.

The second step in the process is to compare N with the normalized D. This is performed in block 600. If N≧D, then the output from comparator block 600 is set to '1', else it is set to '0'.

If the result from comparator block 600 is set to '1', meaning that N≧D, then the value of Y' is set to Y+1 by operation of the summer block 630, and N' is set to N−D by selecting input 1 of multiplexer 640.

If, however, the result from comparator block 600 is set to '0', meaning that N<D, then the value of Y' is set to Y as before, and N' is set to N.

The third step in the process is to divide D by 2. This is performed in block 650 which is a bit-shifter which shifts the word D right by one bit, which is equivalent to a division by 2.

The first, second and third steps described above are repeated a total of K times, where K is the difference in word-length between N and D which was calculated previously from the operation of circuit 10. Once K iterations have been completed, the integer result of the division is stored in Y' and the remainder is stored in N'.

The implementation of the comparator block 600, summer blocks 620, 630, multiplexer 640 and bit shifters 610, 650 will be well known to those skilled in the art of digital circuit design, and so are not herein presented in detail.

Figure 4:
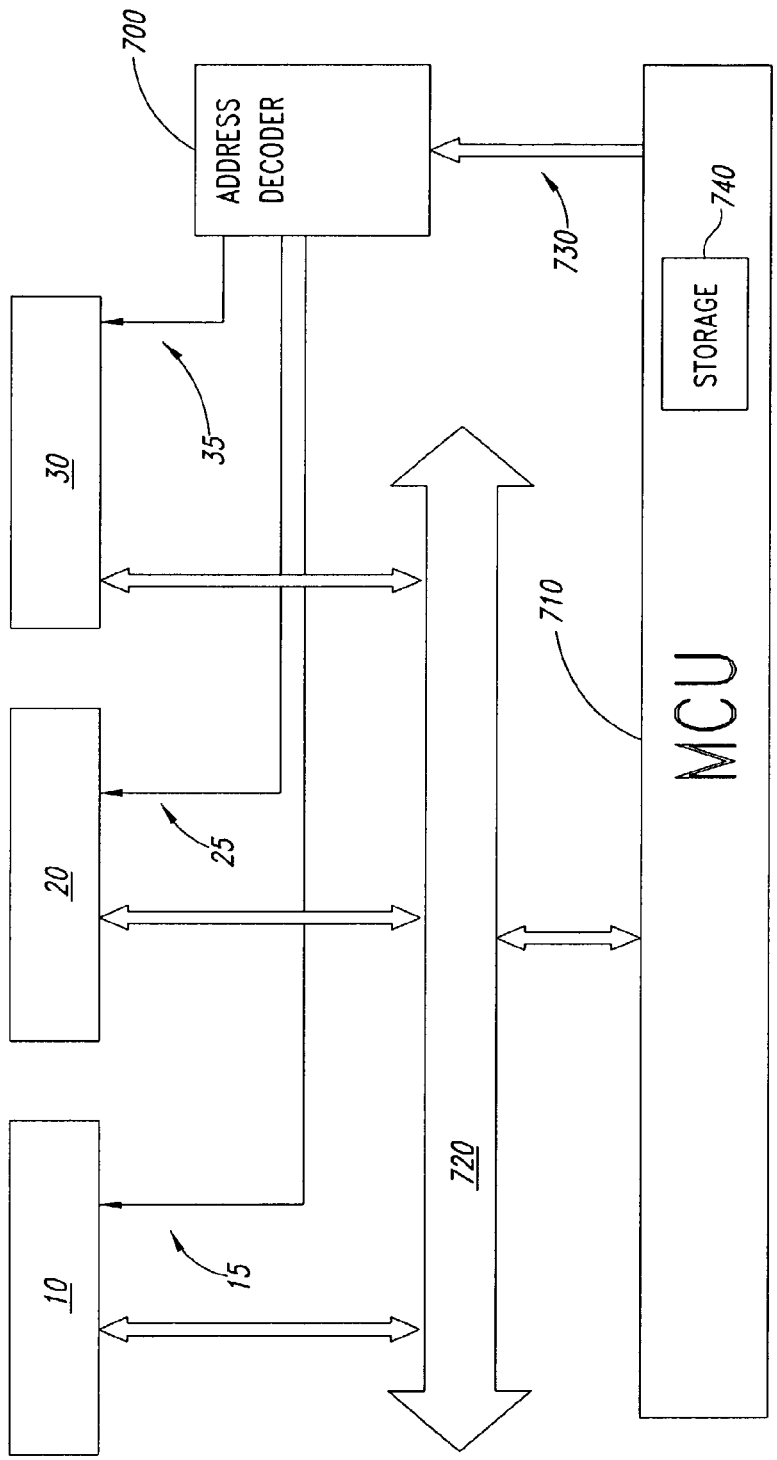
FIG. 4 shows a complete division system including the circuit arrangements of FIGS. 1 to 3.

FIG. 4 shows the circuits 10, 20, 30 of FIGS. 1, 2 and 3 in the context of their interaction with other modules within an MCU. The circuits 10, 20 and 30 are shown connected to the MCU data bus 720, which permits these circuits or modules to communicate with other modules of the MCU 710. To permit communication to occur with a selected module 10, 20, 30, an address decoder 700 is provided which interprets the address information provided on the address bus 730. The address decoder 700 operates in a known manner to produce enable signals 15, 25, 35 to enable circuits 10, 20, 30 respectively.

Since the circuits 10, 20, 30 are implemented in some form of MCU, it is necessary to provide a means by which data may be passed to and from each of them. The customary method is to provide some form of instruction which perhaps calls a sub-routine in the MCU which then passes information directly to and from the circuit in question.

For instance, for the purposes of this example, the circuit 10 of FIG. 1 may be activated through use of the pseudo-code instruction 'Log(A)', where A is the input variable on which the calculation is to be performed. In effect a variable A stored in a given register is operated on by circuit 10. The result of the operation is written back into the same register for later access.

The operation of the circuit 20 of FIG. 2 may be represented by use of the pseudo-code instruction 'Exp(A)', where A is the input variable on which the calculation is to be performed. The result of the operation is written back to the same register for later access.

The operation of the circuit 30 of FIG. 3 may be represented by use of the pseudo-code instruction 'half_divide(A, B, C)', where A represents the numerator, B represents the denominator, and C represents the integer result of the division.

By use of these pseudo-code instructions together with more familiar ones such as 'Sub(A, B)' meaning 'perform the calculation A−B' and 'Multiply(A, B)', it is possible to describe the operation of the entire circuit of FIG. 4.

In the following pseudo-code, each numbered instruction occupies one clock-cycle of the MCU. Comments in the code are delimited using two forward strokes (//).

1. Check Denominator ≠0; Return Error D=0
   //This step ensures that an attempt is not made to divide by zero
2 If Denominator>Numerator return Y=0, N=D
   //This step ensures that D is not greater than N
   //Perform Normalization
3 N=Numerator
4 D=Denominator
5 K=0

6 Log(N) N=Log(N)
   //Supply circuit 10 with the numerator and store result
7 Log(D) D=Log(D)
   //Supply circuit 10 with the denominator and store result
8 Sub(N,D) N=N−D
   //Calculate the difference in word length between N and D
9 K=16−N
   //Set variable K to the jump offset of PC to perform half_divide.
10 Exp(N) N=Exp(N)
   //Calculate $2^N$
11 D=Denominator
   //Set D back to the Denominator
12 Multiply(D,N) N=N*D
   //Shift Denominator bits to align with Numerator
13 N=Numerator
   //Set N back to the Numerator
14 Jump @K Program counter incremented by K
   //Moves program counter forward so that only the required number of
   //iterations of half_divide are performed
   //supply circuit 30 with N, D and Y and output results
   half_divide(N, D, Y)
16 half_divide(N, D, Y)
17 half_divide(N, D, Y)
18 half_divide(N, D, Y)
19 half_divide(N, D, Y)
20 half_divide(N, D, Y)
21 half_divide(N, D, Y)
22 half_divide(N, D, Y)
23 half_divide(N, D, Y)
24 half_divide(N, D, Y)
25 half_divide(N, D, Y)
26 half_divide(N, D, Y)
27 half_divide(N, D, Y)
28 half_divide(N, D, Y)
29 half_divide(N, D, Y)
30 half_divide(N, D, Y)

Note that steps 1 and 2 are optional, and are only needed in some cases, for instance, if the numbers to be divided are not already constrained within certain ranges.

At the end of the execution of the pseudo-code, the integer result of the division is stored in Y and the remainder is stored in N. Discounting the first two optional steps, and steps 3 and 4 which are generally done outside the divide routine itself, it is possible to complete the integer division process in a maximum of 26 MCU clock cycles. As can be seen from the setting of K, which controls the number of iterations of the half_divide instruction, the less the difference in word length between N and D, the quicker the execution of the divide operation.

The remainder from the divide operation, which is stored in N, means that by use of the same instructions and circuitry, a Modulus function, 'Moduluso' is also realized. In other words, the result of N Modulus D is stored in N after step 30.

By simple manipulation of the results of the divide operation, it is possible to realize other useful operations. For instance, a command, 'Floor( )', can be defined which gives only the integer result of N/D.

Another command, 'Ceiling( )', can be defined which outputs the result of N/D and adds one to the result if the remainder is non-zero. A further command, round( ), outputs the result of N/D rounded up or down by determining whether the remainder is more or less than half the denominator. If it is more than half the denominator, then 1 is added to the integer result of the division.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

In the light of the foregoing description, it will be clear to the skilled person that various modifications may be made within the scope of the invention. In particular, the method of the present invention may be performed using custom hardware or by programming a suitably equipped general purpose MCU. The custom hardware may take the form of a specialized processor such as a DSP, or may be implemented using ASIC technology for combination with other task-specific hardware. The programming for the suitably equipped general purpose MCU can be stored in a computer-readable medium 740 that can be part of the MCU 710 or connected to the MCU temporarily or permanently. The term "computer-readable medium" as used herein refers to any medium that participates in providing instructions to processor MCU for execution. Such a medium may take many forms, including but not limited to, non-volatile media, volatile media, and transmission media. Transmission media includes coaxial cables, copper wire and fiber optics. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

The present invention includes any novel feature or combination of features disclosed herein either explicitly or any generalization thereof irrespective of whether or not it relates to the claimed invention or mitigates any or all of the problems addressed.

The invention claimed is:

1. An apparatus for dividing a first binary number (N), having a number of significant bits, by a second binary number (D), having a number of significant bits, to output an integer result (Y), comprising:
   a first circuit arranged to calculate the numbers of significant bits in N and D, the first circuit including a plurality of sequentially connected decrementers arranged to be disabled by a first occurrence of a binary '1' in N, such that the output of a last in the plurality of sequentially connected decrementers outputs a number representing a bit position in N of a most significant bit of N;
   a second circuit arranged to align the most significant bit of N with a most significant bit of D according to a difference (K) between the numbers of significant bits of N and D; and
   a third circuit arranged to initialize Y and repeat K times:
      multiplying Y by 2;
      dividing D by 2;
      increasing Y by 1, and setting N equal to N-D, if N is greater than or equal to D.

2. Apparatus as claimed in claim 1 wherein the second circuit includes a plurality of AND gates, each of said plurality of AND gates having a plurality of input ports, and each of said plurality of AND gates having a different combination of its input ports inverted.

\* \* \* \* \*